United States Patent
Su et al.

(10) Patent No.: US 9,938,167 B2
(45) Date of Patent: Apr. 10, 2018

(54) DEVICE FOR SEA WATER DESALINATION AND POWER GENERATION

(71) Applicant: Dalian University of Technology, Dalian (CN)

(72) Inventors: Xiaohui Su, Dalian (CN); Guang Zhao, Dalian (CN); Yan Liu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 720 days.

(21) Appl. No.: 14/480,652

(22) Filed: Sep. 9, 2014

(65) Prior Publication Data

US 2014/0374330 A1 Dec. 25, 2014

Related U.S. Application Data

(63) Continuation-in-part of application No. PCT/CN2013/000149, filed on Feb. 17, 2013.

(30) Foreign Application Priority Data

Mar. 9, 2012 (CN) .......................... 2012 1 0062030

(51) Int. Cl.
| | |
|---|---|
| *C02F 1/44* | (2006.01) |
| *F03B 13/26* | (2006.01) |
| *B01D 61/02* | (2006.01) |
| *B01D 61/10* | (2006.01) |

(Continued)

(52) U.S. Cl.
CPC ............ *C02F 1/441* (2013.01); *B01D 61/025* (2013.01); *B01D 61/10* (2013.01); *F03B 13/26* (2013.01); *F03B 13/264* (2013.01); *B01D 2313/243* (2013.01); *B01D 2313/36* (2013.01); *C02F 2103/007* (2013.01); *C02F 2103/08* (2013.01); *C02F 2201/008* (2013.01); *C02F 2201/009* (2013.01); *C02F 2301/024* (2013.01); *C02F 2303/10* (2013.01); *F05B 2220/62* (2013.01);

(Continued)

(58) Field of Classification Search
None
See application file for complete search history.

(56) References Cited

U.S. PATENT DOCUMENTS

| | | | | |
|---|---|---|---|---|
| 6,139,740 | A * | 10/2000 | Oklejas | ................. B01D 61/06 210/195.1 |
| 2007/0241566 | A1* | 10/2007 | Kuehnle | ............... F03B 17/061 290/53 |

* cited by examiner

*Primary Examiner* — Richard C Gurtowski
(74) *Attorney, Agent, or Firm* — Matthias Scholl, PC; Matthias Scholl

(57) ABSTRACT

A device for sea water desalination and power generation, including: a tidal current turbine, a coupling, a revolving shaft, a booster pump, and a body. The body includes a chamber, a divider, and an end cover. The divider and the end cover are in fixed connection to the body, and the divider divides the chamber into a closed pumping chamber and a closed desalination and power generation chamber. The booster pump is disposed in the pumping chamber and is driven by the revolving shaft. The tidal current turbine is connected to the revolving shaft via the coupling. The desalination and power generation chamber includes a seawater pretreatment device, a seawater desalinating unit including an unsteady reverse osmosis membrane, a flow battery, and a controller. The booster pump is connected to the seawater pretreatment device via an inlet tube, and is connected to the seawater desalinating unit via an outlet tube.

12 Claims, 3 Drawing Sheets

(51) Int. Cl.
*C02F 103/00* (2006.01)
*C02F 103/08* (2006.01)
(52) U.S. Cl.
CPC ............... *Y02E 10/28* (2013.01); *Y02E 10/38* (2013.01); *Y02P 80/158* (2015.11); *Y02W 10/30* (2015.05)

DEVICE FOR SEA WATER DESALINATION AND POWER GENERATION

CROSS-REFERENCE TO RELATED APPLICATIONS

This application is a continuation-in-part of International Patent Application No. PCT/CN2013/000149 with an international filing date of Feb. 17, 2013, designating the United States, now pending, and further claims priority benefits to Chinese Patent Application No. 201210062030.6 filed Mar. 9, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18$^{th}$ Floor, Cambridge, Mass. 02142.

BACKGROUND OF THE INVENTION

Field of the Invention

The invention is related to a device for sea water desalination and power generation.

Description of the Related Art

Conventional seawater desalination devices have the following disadvantages: 1. The tidal current energy cannot be directly used to boost the seawater pressure, and thus the energy consumption is large; 2. The concentration polarization phenomenon cannot be removed from the desalination by reverse osmosis, thereby resulting in low desalination efficiency; 3. The resulting high pressure strong brine is directly discharged and cannot be recycled, which increases the desalination costs and pollutes the environment.

SUMMARY OF THE INVENTION

In view of the above-described problems, it is one objective of the invention to provide a device for sea water desalination and power generation that features low investment cost and high desalination efficiency.

To achieve the above objective, in accordance with one embodiment of the invention, there is provided a device for sea water desalination and power generation, comprising: a tidal current turbine, a coupling, a revolving shaft, a booster pump, and a body. The body comprises a chamber, a divider, and an end cover. The divider and the end cover are in fixed connection to the body, and the divider divides the chamber into a closed pumping chamber and a closed desalination and power generation chamber. The booster pump is disposed in the pumping chamber and is driven by the revolving shaft. The tidal current turbine is connected to the revolving shaft via the coupling; a sealing assembly and a booster pump bearing are disposed between the revolving shaft and the body. The coupling comprises a brake gear. The desalination and power generation chamber comprises a seawater pretreatment device, a seawater desalinating unit comprising an unsteady reverse osmosis membrane, a flow battery, and a controller. The booster pump is connected to the seawater pretreatment device via an inlet tube, and is connected to the seawater desalinating unit via an outlet tube. The seawater desalinating unit is connected to the flow battery via a concentrated brine tube; a streamlined guide is disposed between the body and the tidal current turbine; a rudder is disposed in the proximity of the end cover; and the body further comprises a support, a seawater inlet, a freshwater tube, and a brine discharge outlet.

In a class of this embodiment, the booster pump employs a plunger-type rotary pump. A swash plate holder is disposed in the pump chamber and is in fixed connection to the body. The revolving shaft is in fixed connection to a cylinder of the booster pump. A plunger and a reset spring are disposed in the cylinder and cooperate with an adjustable swash plate disposed in the swash plate holder. A supporting bearing is disposed at one end of the revolving shaft in the divider. A plunger chamber in the cylinder cooperates with the inlet tube and the outlet tube of a multi-channel valve plate.

In a class of this embodiment, a flow regulator is disposed in the pump chamber to regulate a slope angle of the adjustable swash plate.

In a class of this embodiment, when the revolving shaft is a horizontal shaft, the tidal current turbine is a horizontal shaft tidal current turbine; when the revolving shaft is a vertical shaft, the tidal current turbine is a vertical shaft tidal current turbine.

Advantages according to embodiments of the invention are summarized below. The device for sea water desalination and power generation comprises the body comprising the closed pumping chamber and the closed desalination and power generation chamber. The tidal current turbine drives the booster pump disposed in the pump chamber via the revolving shaft. The booster pump supplies pretreated seawater for the seawater desalinating unit comprising an unsteady reverse osmosis membrane and the flow battery. The high pressure seawater is desalinated by the unsteady reverse osmosis membrane, and the resulting strong brine is introduced to the flow battery for power generation. The device for sea water desalination and power generation employs the tidal current turbine to boost the seawater pressure, which is an unsteady pressure, so that the seawater fluctuates irregularly within the range of high pressure, thereby producing turbulence on the uneven membrane surface. Thus, the concentration polarization phenomenon is weakened, the reverse osmosis pressure is decreased, and the desalination efficiency is improved. The energy cycle of tidal current energy- mechanical energy-pressure energy in this invention is concise and effective, and the high pressure strong brine drives the pump to rotate in the flow battery for power generation. Thus, the tidal current energy is transformed into electric energy, thereby completely utilizing the tidal current energy with high efficiency.

BRIEF DESCRIPTION OF THE DRAWINGS

The invention is described hereinbelow with reference to accompanying drawings, in which.

Figure 1:
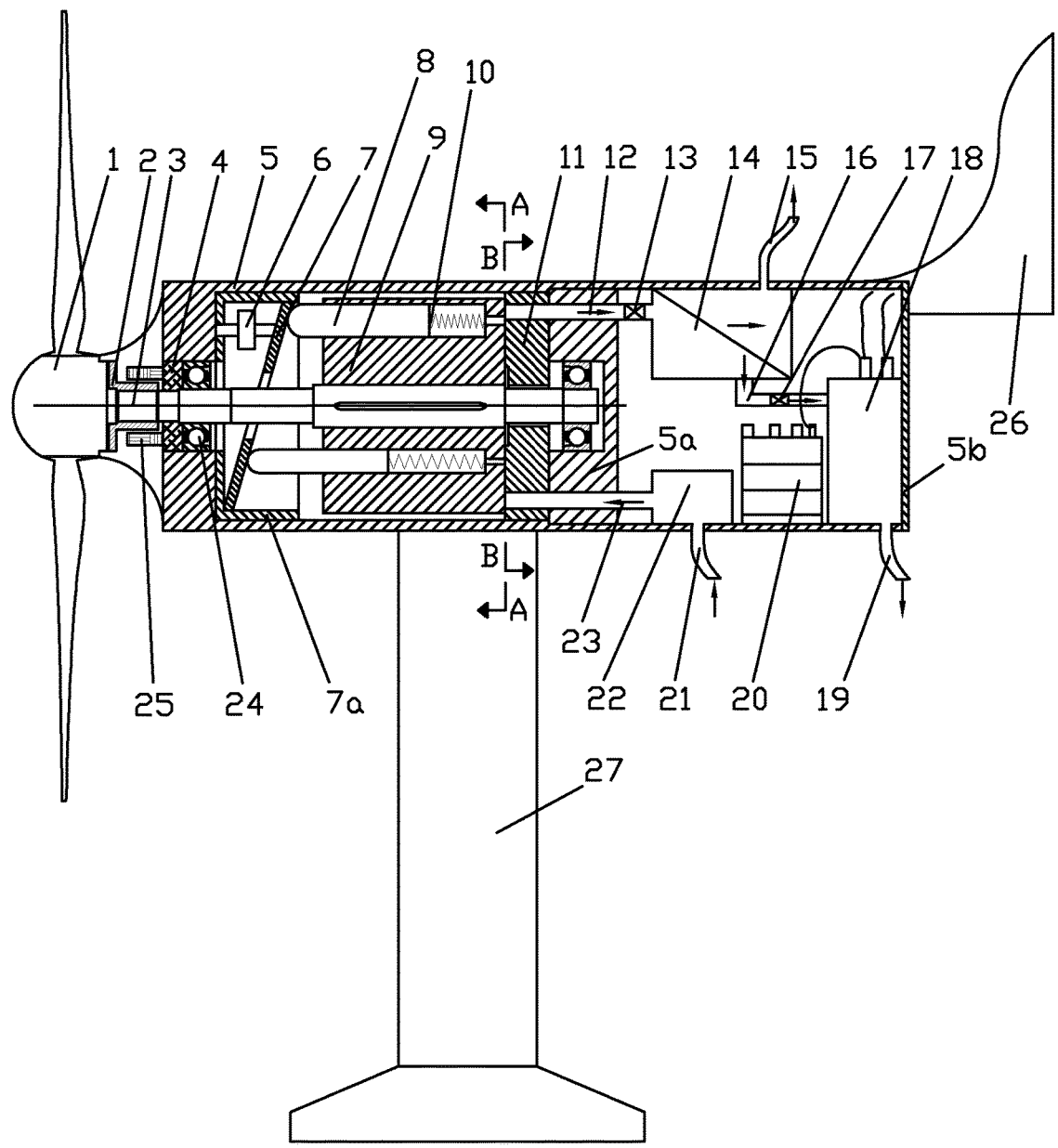
FIG. 1 is a schematic diagram of a device for sea water desalination and power generation in accordance with one embodiment of the invention.

In the drawings, the following reference numbers are used: 1. Tidal current turbine; 2. Coupling; 3. Revolving shaft; 4. Sealing assembly; 5. Body; 5a. Divider; 5b. End Cover; 6. Flow regulator; 7. Adjustable swash plate; 7a. Swash plate holder; 8. Plunger; 9. Cylinder; 10. Reset spring; 11. Multi-channel valve plate; 12. Outlet tube; 13. Inlet overflow valve; 14. Unsteady reverse osmosis membrane; 15. Freshwater tube; 16. Strong brine tube; 17. Outlet overflow valve; 18. Flow battery; 19. Brine discharge outlet; 20. Controller; 21. Seawater inlet; 22. Seawater pretreatment device; 23. Inlet tube; 24. Booster pump bearing; 25. Brake gear; 26. Rudder; 27. Support.

DETAILED DESCRIPTION OF THE EMBODIMENTS

For further illustrating the invention, experiments detailing a device for sea water desalination and power generation are described below. It should be noted that the following examples are intended to describe and not to limit the invention.

Figure 2:
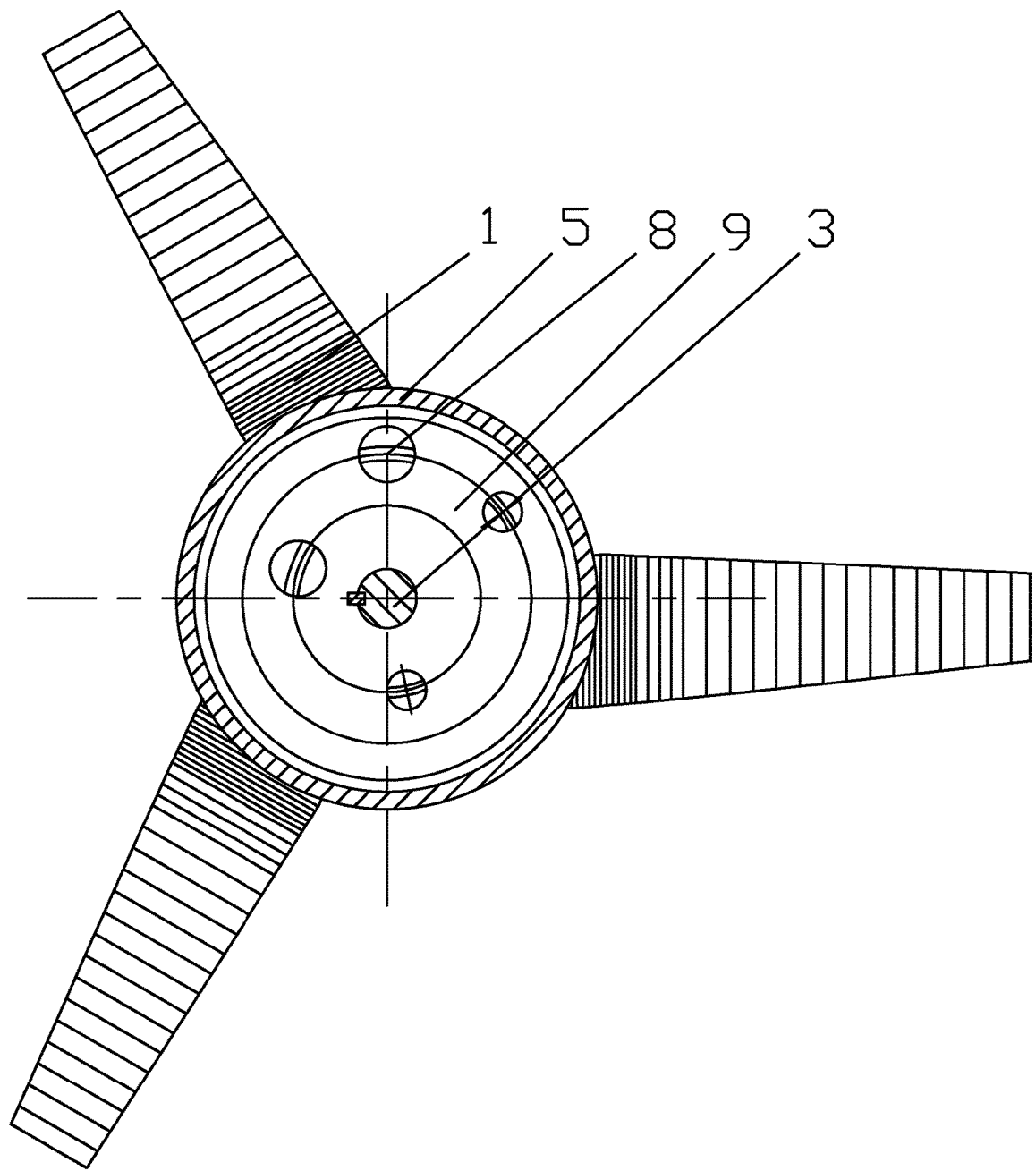
FIG. 2 is a sectional view taken from line A-A in FIG. 1.
Figure 3:
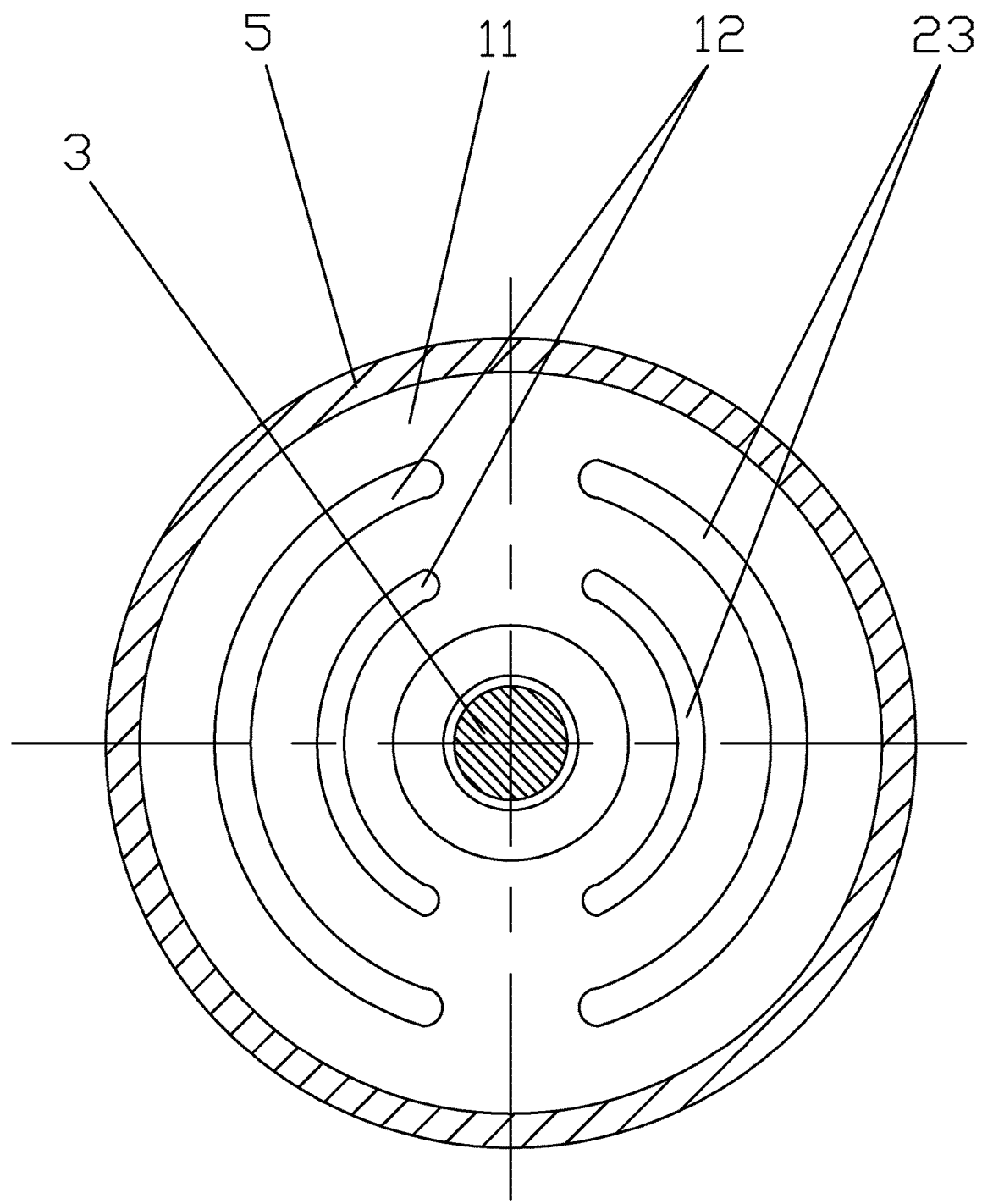
FIG. 3 is a sectional view taken from line B-B in FIG. 1.

As shown in FIGS. 1-3, a device for sea water desalination and power generation comprises a horizontal shaft tidal current turbine 1 and a body 5. The body 5 comprises a chamber, a divider 5a, and an end cover 5b. The divider 5a and the end cover 5b are in fixed connection to the body. The divider 5a divides the chamber into a closed pumping chamber and a closed desalination and power generation chamber. The tidal current turbine 1 is connected to a revolving shaft 3 via a coupling 2. A booster pump is disposed in the pumping chamber and is driven by the revolving shaft 3. A sealing assembly 4 and a booster pump bearing 24 are disposed between the revolving shaft 3 and the body 5. The coupling 2 comprises a brake gear 25.

The booster pump employs a plunger-type rotary pump. A swash plate holder 7a is disposed in the pump chamber and is in fixed connection to the body 5. The revolving shaft 3 is in fixed connection to a cylinder of the booster pump. A plunger 8 and a reset spring 10 are disposed in the cylinder 9 and cooperate with an adjustable swash plate 7 disposed in the swash plate holder 7a. A flow regulator 6 is disposed in the pump chamber to regulate a slope angle of the adjustable swash plate 7. A supporting bearing is disposed at one end of the revolving shaft 3 in the divider 5a. A plunger chamber in the cylinder 9 cooperates with the inlet tube 23 and the outlet tube 12 of a multi-channel valve plate 11.

The desalination and power generation chamber comprises a seawater pretreatment device 22, a seawater desalinating unit comprising an unsteady reverse osmosis membrane 14, a flow battery 18, and a controller 20. The booster pump is connected to the seawater pretreatment device 22 via an inlet tube 23, and is connected to the seawater desalinating unit via an outlet tube 12. The seawater desalinating unit is connected to the flow battery 18 via a strong brine tube 16. An inlet overflow valve 13 is disposed at the outlet tube 12 of the booster pump, and an outlet overflow valve 17 is disposed at the strong brine tube 16.

A streamlined guide is disposed between the body 5 and the tidal current turbine 1; a rudder is disposed in the proximity of the end cover 5b; and the body further comprises a support 27, a seawater inlet 21, a freshwater tube 15, and a brine discharge outlet 19.

The working principle of the device for sea water desalination and power generation is summarized as follows. Natural sea water is introduced to the seawater pretreatment device 22 via the seawater inlet 21. The purified sea water flows into the multi-channel valve plate 11 via the inlet tube 23 of the booster pump. The tidal current drives the tidal current turbine 1 to rotate. The tidal current turbine 1 drives the revolving shaft 3 and the cylinder 9 to rotate via the coupling 2 with the support of the booster pump bearing. By the action of stationary adjustable swash plate 7 and the reset spring 10, the plunger 8 moves axially in the plunger chamber of the cylinder 9. Thus, the pressure of the sea water in the multi-channel valve plate 11 is boosted. The high pressure sea water flows into the seawater desalinating unit comprising the unsteady reverse osmosis membrane 14 via the outlet tube 12 and the inlet overflow valve 13. Part of the sea water is converted into freshwater when penetrating the reverse osmosis membrane, which is stored in the freshwater tube 15. Another part of the sea water is concentrated to yield high pressure strong brine which flows into the flow battery 18 via the strong brine tube 16 and the outlet overflow valve 17. The high pressure strong brine drives the pump in the flow battery to do work. Thus, the chemical energy is transformed into electric energy and stored. Thereafter, the strong brine is discharged into the ocean via a brine discharge outlet 19. During working, the sealing assembly 4 prevents the sea water from flowing into the body 5. When the pressure needs changing, the controller 20 regulates the flow regulator 6 to alter the slope angle of the adjustable swash plate 7. When the direction of the tidal current varies, the rudder can automatically modify the direction of the tidal current turbine 1. In extreme weather conditions, the controller 20 can control the brake gear 25 to stop the rotation of the tidal current turbine 1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A device for seawater desalination, comprising:
a) a turbine;
b) a coupling;
c) a revolving shaft;
d) a booster pump, the booster pump comprising an inlet channel and an outlet channel;
e) a main body, the main body comprising a chamber, a divider, an end cover, a seawater inlet, a freshwater outlet, and a brine discharge outlet;
f) a first shaft bearing;
g) a second shaft bearing;
h) a seawater desalinating unit comprising a reverse osmosis membrane; and
i) a seawater pretreatment device;
wherein:
the chamber is enclosed by the end cover;
the divider is disposed in the chamber, and the divider and the end cover are in fixed connection;
the divider subdivides the chamber into a pumping chamber and a desalination and power generation chamber;
the booster pump is disposed in the pumping chamber;
the first shaft bearing is disposed on the divider;
the second shaft bearing is disposed on an end of the end cover, wherein the end of the end cover is adjacent to the pumping chamber;
the revolving shaft is supported by the first and second shaft bearings;
one end of the revolving shaft is connected to the turbine via the coupling, and the other end of the revolving shaft is fixedly connected to the booster pump;
the turbine is adapted to be driven by a tide current;
the booster pump is adapted to be driven by the revolving shaft;
the booster pump is connected to the seawater pretreatment device via the inlet channel, and is connected to the seawater desalinating unit via the outlet channel;
the seawater pretreatment device and the seawater desalinating unit are disposed in the desalination and power generation chamber; and the booster pump is adapted to boost pressure of seawater that is fed to the reverse osmosis membrane.

2. A device for seawater desalination, comprising:
a) a turbine;
b) a coupling;
c) a revolving shaft;
d) a booster pump, the booster pump comprising an inlet channel, an outlet channel, a swash plate holder, a swash plate, a cylinder, a plurality of plunger chambers, a plurality of plungers, a plurality of reset springs, and a multi-channel valve plate;
e) a main body, the main body comprising a chamber, a divider, an end cover, a seawater inlet, a freshwater outlet, and a brine discharge outlet;
f) a first shaft bearing;
g) a second shaft bearing;
h) a seawater desalinating unit comprising a reverse osmosis membrane; and
i) a seawater pretreatment device;
wherein:
the chamber is enclosed by the end cover;
the divider is disposed in the chamber, and the divider and the end cover are in fixed connection;
the divider subdivides the chamber into a pumping chamber and a desalination and power generation chamber;
the booster pump is disposed in the pumping chamber;
the first shaft bearing is disposed on the divider;
the second shaft bearing is disposed on an end of the end cover, wherein the end of the end cover is adjacent to the pumping chamber;
the revolving shaft is supported by the first and second shaft bearings;
one end of the revolving shaft is connected to the turbine via the coupling, and the other end of the revolving shaft is fixedly connected to the booster pump;
the turbine is adapted to be driven by a tide current;
the booster pump is adapted to be driven by the revolving shaft;
the booster pump is connected to the seawater pretreatment device via the inlet channel, and is connected to the seawater desalinating unit via the outlet channel;
the seawater pretreatment device and the seawater desalinating unit are disposed in the desalination and power generation chamber;
the booster pump is adapted to boost pressure of seawater that is fed to the reverse osmosis membrane;
the booster pump employs a plunger-type rotary pump;
the swash plate holder is disposed in the pumping chamber and is in fixed connection to the end cover;
the swash plate is fixedly supported by the swash plate holder;
the revolving shaft is in fixed connection to the cylinder;
the plurality of plunger chambers is disposed in the cylinder, each of the plurality of plungers is disposed in one of the plurality of plunger chambers, and each of the plurality of springs is disposed in and supported by one of the plurality of plunger chambers;
each of the plurality of plungers is supported by one of the plurality of springs, and is disposed between the one of the plurality of springs and the swash plate;
the inlet channel and the outlet channel are disposed in the multi-channel valve plate;
each of the plurality of plunger chambers is adapted to communicate with the inlet channel or the outlet channel; and
when the cylinder is rotated, the swash plate is cooperated with each of the plurality of springs to move one of the plurality of plungers.

3. The device of claim 2, wherein a flow regulator is disposed in the pump chamber to regulate a slope angle of the swash plate with respect to the revolving shaft.

4. The device of claim 1, wherein when the revolving shaft is a horizontal shaft, the turbine is a horizontal shaft turbine; when the revolving shaft is a vertical shaft, the turbine is a vertical shaft turbine.

5. The device of claim 2, wherein when the revolving shaft is a horizontal shaft, the turbine is a horizontal shaft turbine; when the revolving shaft is a vertical shaft, the turbine is a vertical shaft turbine.

6. The device of claim 1, further comprising a flow battery disposed in the desalination and power generation chamber, wherein the seawater desalinating unit further comprises a brine tube, and the flow battery is connected to the brine tube and is adapted to convert chemical energy into electrical energy.

7. The device of claim 2, further comprising a flow battery disposed in the desalination and power generation chamber, wherein the seawater desalinating unit further comprises a brine tube, and the flow battery is connected to the brine tube and is adapted to convert chemical energy into electrical energy.

8. The device of claim 1, further comprising a controller disposed in the desalination and power generation chamber, wherein the coupling further comprises a break gear, and the controller is adapted to control the break gear to allow for or stop the rotation of the turbine.

9. The device of claim 2, the device further comprising a controller disposed in the desalination and power generation chamber, wherein the coupling further comprises a break gear, and the controller is adapted to control the break gear to allow for or stop the rotation of the turbine.

10. The device of claim 9, wherein a flow regulator is disposed in the pump chamber to regulate a slope angle of the swash plate with respect to the revolving shaft, and the controller is adapted to control the regulation of the flow regulator.

11. The device of claim 1, further comprising a rudder disposed on the end cover, wherein the rudder is adapted to adjust an orientation of the turbine.

12. The device of claim 2, further comprising a rudder disposed on the end cover, wherein the rudder is adapted to adjust an orientation of the turbine.

* * * * *